(12) United States Patent
Harvey

(10) Patent No.: US 11,394,574 B2
(45) Date of Patent: Jul. 19, 2022

(54) AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH

(71) Applicant: PassiveLogic, Inc., Holladay, UT (US)

(72) Inventor: Troy Aaron Harvey, Brighton, UT (US)

( * ) Notice: Subject to any disclaimer, the term of this patent is extended or adjusted under 35 U.S.C. 154(b) by 0 days.

(21) Appl. No.: 16/921,924

(22) Filed: Jul. 6, 2020

(65) Prior Publication Data

US 2020/0336328 A1 Oct. 22, 2020

Related U.S. Application Data

(63) Continuation of application No. 16/007,963, filed on Jun. 13, 2018, now Pat. No. 10,708,078.

(60) Provisional application No. 62/518,745, filed on Jun. 13, 2017.

(51) Int. Cl.
*H04L 12/28* (2006.01)
*G05B 15/02* (2006.01)

(52) U.S. Cl.
CPC .......... *H04L 12/2816* (2013.01); *G05B 15/02* (2013.01); *G05B 2219/2642* (2013.01)

(58) Field of Classification Search
CPC ................ H04L 12/2816; G05B 15/02; G05B 2219/2642
See application file for complete search history.

(56) References Cited

U.S. PATENT DOCUMENTS

| | | | |
|---|---|---|---|
| 4,385,384 A * | 5/1983 | Rosbury | H04L 1/24 375/224 |
| 5,224,648 A | 7/1993 | Simon et al. | |
| 5,519,834 A * | 5/1996 | Kamerman | H04L 12/462 370/445 |
| 6,119,125 A | 9/2000 | Gloudeman et al. | |
| 6,967,565 B2 | 11/2005 | Lingemann | |
| 7,010,789 B1 | 3/2006 | Kimelman et al. | |

(Continued)

OTHER PUBLICATIONS

Massif, N., Kaji, S., & Sabrouin, R. (Jul. 2005). Optimization of HVAC control system strategy using two-objective genetic algorithm, Journal of HVAC&R Research, 11(3), 459-486. (Year: 2005).

(Continued)

*Primary Examiner* — Ramesh B Patel
(74) *Attorney, Agent, or Firm* — Kunzler Bean & Adamson, PC

(57) ABSTRACT

Apparatuses, systems, methods, and computer program products are disclosed for organizing automatic control in automation systems from a system description, using deconstruction of complex equipment graphs. A system control scheme is automatically generated from a deconstruction of an equipment graph into controllable sets of prioritized sub-systems. An equipment graph comprises one or more subsystems of equipment. Prioritized sub-systems comprise a unique routing path through an equipment graph. Prioritized sub-systems comprise the ability to be actuated and are divided into groups of sub-system sets. Groups of sub-system sets comprise synchronous and asynchronous sets and are created for conjoined routing paths of parallel sub-systems.

20 Claims, 8 Drawing Sheets

(56) References Cited

U.S. PATENT DOCUMENTS

| | | | |
|---|---|---|---|
| 7,302,362 B2* | 11/2007 | Misra | G01D 1/18 |
| | | | 340/3.1 |
| 9,020,647 B2 | 4/2015 | Johnson et al. | |
| 9,035,479 B1 | 5/2015 | Gates | |
| 9,258,201 B2 | 2/2016 | McCoy et al. | |
| 9,298,197 B2 | 3/2016 | Matsuoka et al. | |
| 9,557,750 B2 | 1/2017 | Gust et al. | |
| 9,664,400 B2 | 5/2017 | Wroblewski et al. | |
| 10,705,492 B2* | 7/2020 | Harvey | G05B 17/02 |
| 10,708,078 B2* | 7/2020 | Harvey | G05B 15/02 |
| 2002/0152298 A1 | 10/2002 | Kikta et al. | |
| 2005/0097161 A1* | 5/2005 | Chiou | H04W 16/18 |
| | | | 709/200 |
| 2006/0106530 A1 | 5/2006 | Horvitz et al. | |
| 2007/0055392 A1* | 3/2007 | D'Amato | G05B 13/048 |
| | | | 700/44 |
| 2008/0082183 A1 | 4/2008 | Judge | |
| 2014/0016572 A1 | 1/2014 | Porat et al. | |
| 2014/0277765 A1 | 9/2014 | Karimi et al. | |
| 2014/0288890 A1* | 9/2014 | Khainson | G06F 30/13 |
| | | | 703/1 |
| 2014/0330611 A1* | 11/2014 | Steven | G06Q 10/06314 |
| | | | 705/7.24 |
| 2014/0358291 A1 | 12/2014 | Wells et al. | |
| 2015/0025917 A1* | 1/2015 | Stempora | G06K 9/0061 |
| | | | 705/4 |
| 2015/0066229 A1 | 3/2015 | Lacroix et al. | |
| 2015/0112497 A1 | 4/2015 | Steven et al. | |
| 2016/0016454 A1 | 1/2016 | Yang et al. | |
| 2016/0179075 A1 | 6/2016 | Shin et al. | |
| 2016/0201934 A1 | 7/2016 | Hester et al. | |
| 2017/0076206 A1 | 3/2017 | Lastras-Montano et al. | |
| 2017/0103483 A1 | 4/2017 | Drees et al. | |
| 2017/0171580 A1* | 6/2017 | Hirsch | H04N 21/6125 |
| 2017/0289191 A1* | 10/2017 | Thioux | H04L 63/1441 |
| 2017/0315696 A1* | 11/2017 | Jacobson | H04L 12/2809 |
| 2017/0329289 A1* | 11/2017 | Kohn | G05B 13/0265 |
| 2018/0335759 A1* | 11/2018 | Harvey | G05B 15/02 |

OTHER PUBLICATIONS

Sushanek, F., Kasneci, G., & Weikum, G. (May 2007). YAGO: A core of semantic knowledge unifying WordNet and Wikipedia, WWW 2007, 1-10. (Year: 2007).

Maasoumy, M., Pinto, A., & Sangiovanni-Vincentelli, A, (2001) Model-based hierarchical optimal control design for HVAC systems, Proceedings of the ASME 2011 Dynamic Systems and Control Conference, 1-8. (Year: 2011).

Bordes, A., Weston, J., Collobert, R., & Bengio, Y. (Aug. 2011). Learning structured embeddings of knowledge bases, Proceedings of the Twenty-Fifth AAAI Conference on Artificial Intelligence, 1-6. (Year: 2011).

Nickel, M., Tresp, V., & Kriegel, H. (2011). A three-way model for collective learning on multi-relational data, Proceedings of the 28th International Conference on Machine Learning, 1-8. (Year: 2011).

Socer, R., Chen, D., Manning, C., & Ng, A. (Jan. 2013) Reasoning with neural tensor networks for knowledge base completion, 1-10. (Year: 2013).

Berant, L., Chou, A., Frostig, R., & Ling, P. (Oct. 2013). Semantic parsing on Freebase from question-answer pairs, Proceedings of the 2013 Conference on Empirical Methods in Natural Language Processing, 1533-1544. (Year 2013).

Bordes, A., Usunier, N., Garcia-Duran, A., Weston, J., & Yakhenko, O. (Apr. 2013). Irreflexive and hierarchical relations as translations, 1-5. (Year: 2013).

Bordes, A., Usunier, N., Garcia-Duran, A., Weston, J., & Yakhenko, O. (Dec. 2013). Translating embeddings for modeling multi-relational data, Neural Information Processing Systems (NIPS), 1-9. (Year: 2013).

Chang, K., Yih, W., & Meek, C. (Oct. 2013) Multi-relational latent semantic analysis, Proceedings of the Conference on Empirical Methods in Natural Language Processing (EMNLP), 1-11. (Year: 2013).

Weston, J., Bords, A., Yakhnenko, O, & Usunier, N. (Jul. 2013). Connecting language and knowledge bases with ambedding models for relation extraction, 1-6 (Year: 2013).

Min, B., Grisham, R., Wan, L., Wang, C., & Gondex, D. (Jun. 2013). Distant supervision for relation extraction with an incomplete knowledge base, Proceedings of NAACL-HLT 2013, 777-782. (Year 2013).

Wang, Z., Zhang, J., Feng, J., & Chen, Z. (2014). Knowledge graph embedding by translating on hyperplanes, Proceedings of the Twenty-Eighth AAAI Conference on Artificial Intelligence, 1112-1119. (Year: 2014).

Yang, B., Yih, W., He, X., Gao, J., & Deng, L. (Dec. 2014). Embedding entities and relations for learning and inference in knowledge bases, 1-12. (Year: 2014).

Bordes, A., Glorot, X., Weston, J., & Bengio, Y. (2014). A semantic matching energy function for learning with multi-relational data, Machine Learning, 94(2), 233-259. (Year: 2014).

Lin, Y, Liu, Z., Sun, M., Liue, Y., & Zhu, X. (2015). Learning entity and relation embeddings for knowledge graph completion, in Proceedings of AAAI'15, 1-7. (Year: 2015).

He, H., Balakrishnan, A., Eric, M., & Liang, P. (Apr. 2017). Learning symmetric collaborative dialogue agents with dynamic knowledge graph embeddings, 1-11. (Year: 2017).

Carl-Eric Hagentoft, Assessment Method of Numerical Prediction Models for Combined Heat, Air and Moisture Transfer in Building Components: Benchmarks for One-dimensional Cases, Apr. 2004, Journal of Thermal Env. & Bldg. Sci., Vl. 27, No. 4 (Year: 2004).

BigLadder Software, Occupant Thermal Comfort: Engineering Reference, 2014, The Board of Trustees of the University of Illinois and the Regents of the University of California through the Ernest Orlando Lawrence Berkeley National Labaratory (Year: 2014).

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge et al., "An Effective Temperature Scale Based on a Simple Model of Human Physiological Regulatory Response," ASIYRAE Semiannnual Meeting in Philadelphia, Pennsylyania, Jan. 24-28, 1971.

Gagge, et. al., A Standard Predictive index of Human Response to the Thermal Environment, ASHRAE Transactions 1986, Part 2B.

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, et al., "Self-tuning dynamic models of HVAC system components", Energy and Buildings 40 (2008) 1709-1720.

Nassif, Nabil, (2005), Optimization of HVAC control system strategy using two-objective genetic algorithm [microform].

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

U.S. Appl. No. 15/986,746 Office Action dated Mar. 25, 2020.
U.S. Appl. No. 15/986,746 Office Action dated Aug. 7, 2019.

(56) References Cited

OTHER PUBLICATIONS

U.S. Appl. No. 15/995,019 Final Office Action dated Apr. 15, 2020.
U.S. Appl. No. 15/995,019 Office Action dated Jul. 26, 2019.
U.S. Appl. No. 16/008,713 Final Office Action dated Jun. 18, 2020.
U.S. Appl. No. 16/008,713 Office Action dated Nov. 1, 2019.
U.S. Appl. No. 16/921,903 Notice of Allowance, dated Mar. 16, 2022.

* cited by examiner

AUTOMATIC CONTROL METHOD OF GENERATING SUB-SYSTEMS AND SUB-SYSTEM ARBITRATION FROM THE DECONSTRUCTION OF A COMPLEX EQUIPMENT GRAPH

FIELD

The present disclosure relates to control of building systems using automated means. More specifically, the present disclosure relates to an automated method of deconstructing a graph representing building systems equipment and connections into sub-systems. The present disclosure particularly addresses the control and automation of HVAC, energy, lighting, irrigation systems, and the like.

BACKGROUND

Modern buildings contain a varied and complex set of systems for managing and maintaining the building environment. Building automation systems are used to automate the control of many separate systems, such as those used for lighting, climate, security, entertainment, etc. Building automation systems can perform a number of functions, such as automation of equipment scheduling, monitoring of various building parameters, optimization of resource consumption, event or alarm reporting and handling, and many others.

Building automation system implementation requires programmatic understanding of what equipment is available to the building automation system and how that equipment may be utilized. For example, the building automation system needs to account for information such as what equipment can be run simultaneously, what groups of equipment work together to achieve a particular objective, etc. Automatic discovery of this information is challenging with current methodologies.

SUMMARY

The present disclosure provides a method of automatically decomposing a complex graph of connected equipment into equipment sub-systems for the purpose of automatic labeling of automatable systems, sub-system, and the equipment therein for machine-driven control. Further the present disclosure relates to user interfaces that allow a user to draw a graph of equipment having n-complexity and n-number of routing paths, and decompose that drawing into a controllable system of atomic sub-systems automatically.

The present disclosure describes a method for the decomposition of sub-systems to automatically infer controllability, ranking, prioritization, and analyzing the sub-systems to identify those that are unique and complete, categorizing sub-systems into synchronous groups (in which only a single sub-system can operate at a time), and asynchronous groups (in which more than one sub-system can operate simultaneously).

The present disclosure details how building automation system would automatically provide semantic labeling for the sub-system and its equipment for retrieval during an analytic stage.

The present disclosure also relates to the automatic reduction of state space in a n-complexity graph of equipment. By using the semantic labeling together with the deconstructed set of meaningful sub-systems, the meaningful control state space of the system can be derived.

There has thus been outlined, rather broadly, the features of the disclosure in order that the detailed description thereof that follows may be better understood and in order that the present contribution to the art may be better appreciated.

Numerous objects, features and advantages of the present disclosure will be readily apparent to those of ordinary skill in the art upon a reading of the following detailed description of presently preferred, but nonetheless illustrative, embodiments of the present disclosure when taken in conjunction with the accompanying drawings. The disclosure is capable of other embodiments and of being practiced and carried out in various ways. Also, it is to be understood that the phraseology and terminology employed herein are for the purpose of descriptions and should not be regarded as limiting.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptions or variations of the present disclosure.

This section summarizes some aspects of the present disclosure and briefly introduces some preferred embodiments. Simplifications or omissions in this section as well as in the abstract or the title of this description may be made to avoid obscuring the purpose of this section, the abstract, and the title. Such simplifications or omissions are not intended to limit the scope of the present disclosure nor imply any limitations.

Several advantages of one or more aspects of the present disclosure include but are not limited to: to generate a system control scheme automatically from a complex equipment graph; to decompose automatically the equipment graph into sub-system sets, where the decomposition enables the generation of a system control scheme; to enable automatic semantic reasoning about the generation of said system control scheme from the decomposition, thereby enabling more efficient generation of the control scheme as well as increasing human reasoning of the control scheme generation process; to automatically select valid and unique equipment sub-systems from said decomposition, thereby reducing the control scheme search space so as to increase control path search efficiency; to enable automatic prioritization of sub-systems, thereby enabling the generation of a system control scheme that responds to system preferences and priorities; to classify automatically sub-systems as either asynchronous or synchronous, thereby enabling the generation of a control scheme that responds to precedence and sequential operation limitations of particular equipment and sets of equipment. Other advantages of one or more aspects of the disclosed method will be apparent from consideration of the following drawings and description.

DESCRIPTION OF DRAWINGS

To further clarify various aspects of some example embodiments of the present disclosure, a more particular description of the disclosure will be rendered by reference to specific embodiments thereof that are illustrated in the appended drawings. It is appreciated that the drawings depict only illustrated embodiments of the disclosure and are therefore not to be considered limiting of its scope. The disclosure will be described and explained with additional specificity and detail through the use of the accompanying drawings in which.

REFERENCE NUMERALS

Figure 1:
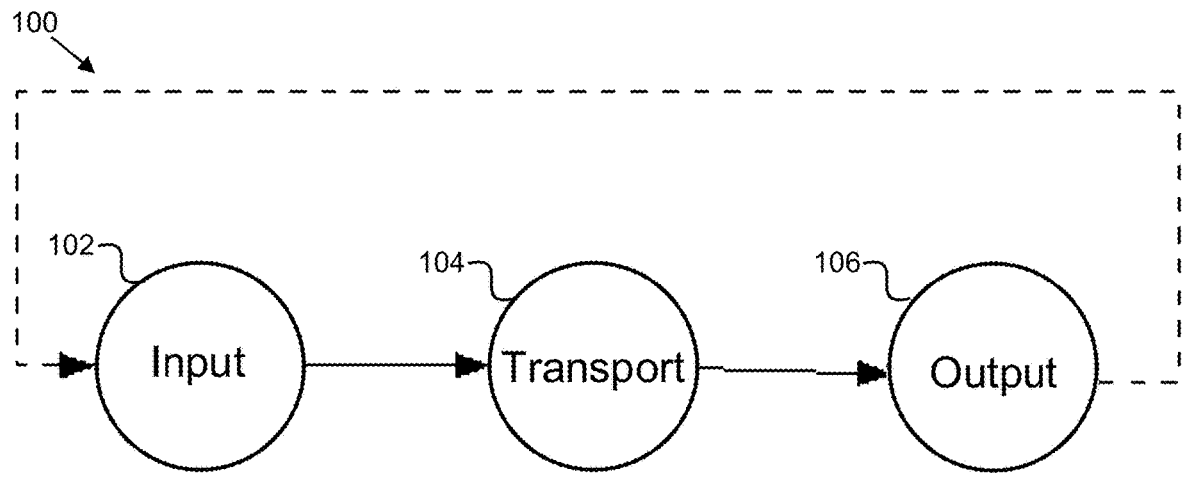
FIG. 1 Base sub-system structure.

The following conventions are used for reference numerals: the first digit indicates the figure in which the numbered part first appears (the first two digits are used for the figure number when required). The remaining digits are used to identify the part in the drawing.

301 solar thermal hot water panel
302 heating source
303 transport
304 transport
305 store (virtual heat source)
306 mixer
307 transport
308 load/system head
309 router
310 router
311 cooling source
401 valid sub-system column
402 invalid sub-system column
403 duplicate sub-system column
501 sub-system 1
502 sub-system 2
503 sub-system 3
504 sub-system 4
505 sub-system 5

DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

Explanation will be made below with reference to the aforementioned figures for illustrative embodiments concerning the present invention.

The present disclosure describes a method of decomposing a system of interconnected equipment into various sets of equipment comprising various sub-systems. The basic structure of such a sub-system 100 is shown in FIG. 1. A sub-system 100 comprises: an input 102, or a source of the relevant resource; a transport 104, whereby said relevant resource is transported; and an output 106, or sink of said relevant resource. For example, in one embodiment, a sub-system 100 may have as an input 102 a heating source, a water pump as a transport 104, and an output 106 of a hot water storage tank. The transport 104 moves water from the heating source to the output 106 hot water storage tank.

Figure 2:
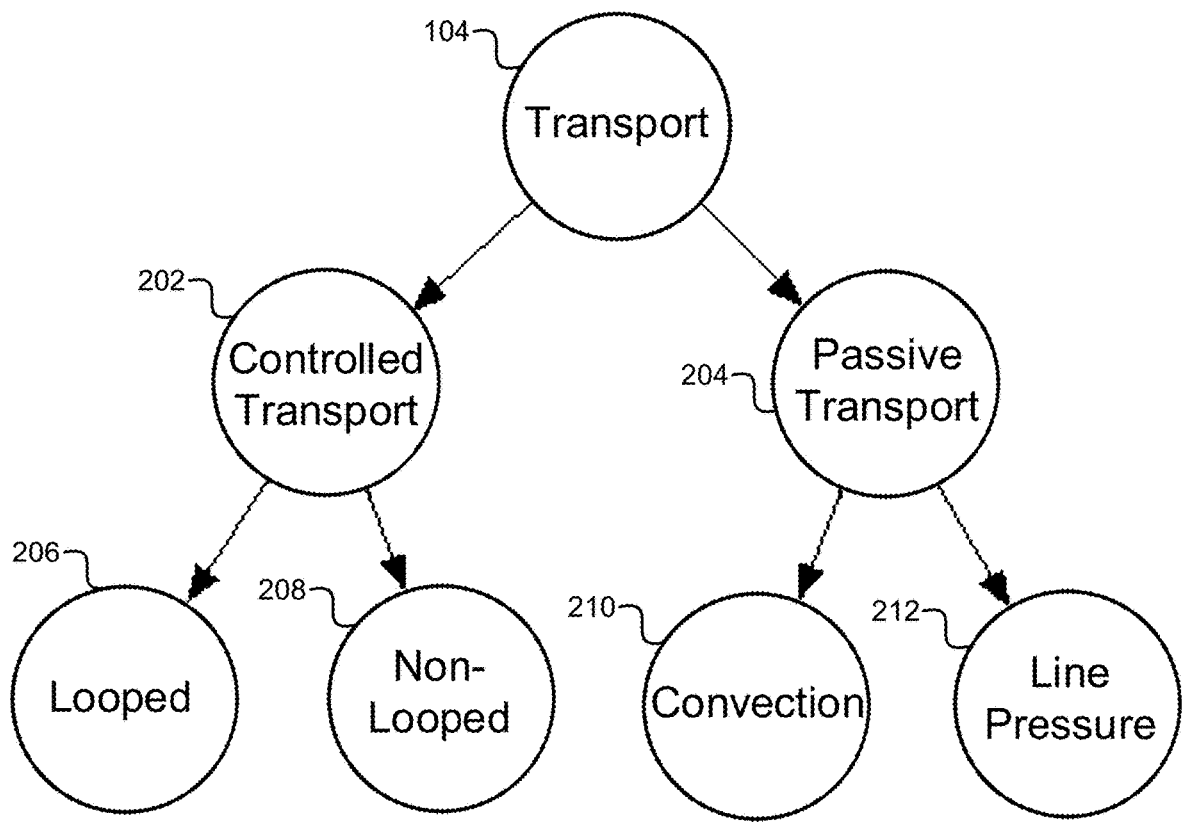
FIG. 2 Transport class detail.

In various embodiments, an equipment sub-system 100 transport 104 may use various means. As shown in FIG. 2, in one embodiment, the transport 104 may be controlled 202 and either looped 206 or non-looped 208; or passive 204, and may use either convection 210 or line-pressure 212 as a means of transport 104. The transport element 104 of a sub-system 100 may consist of one or multiple transport devices 104.

Figure 3:
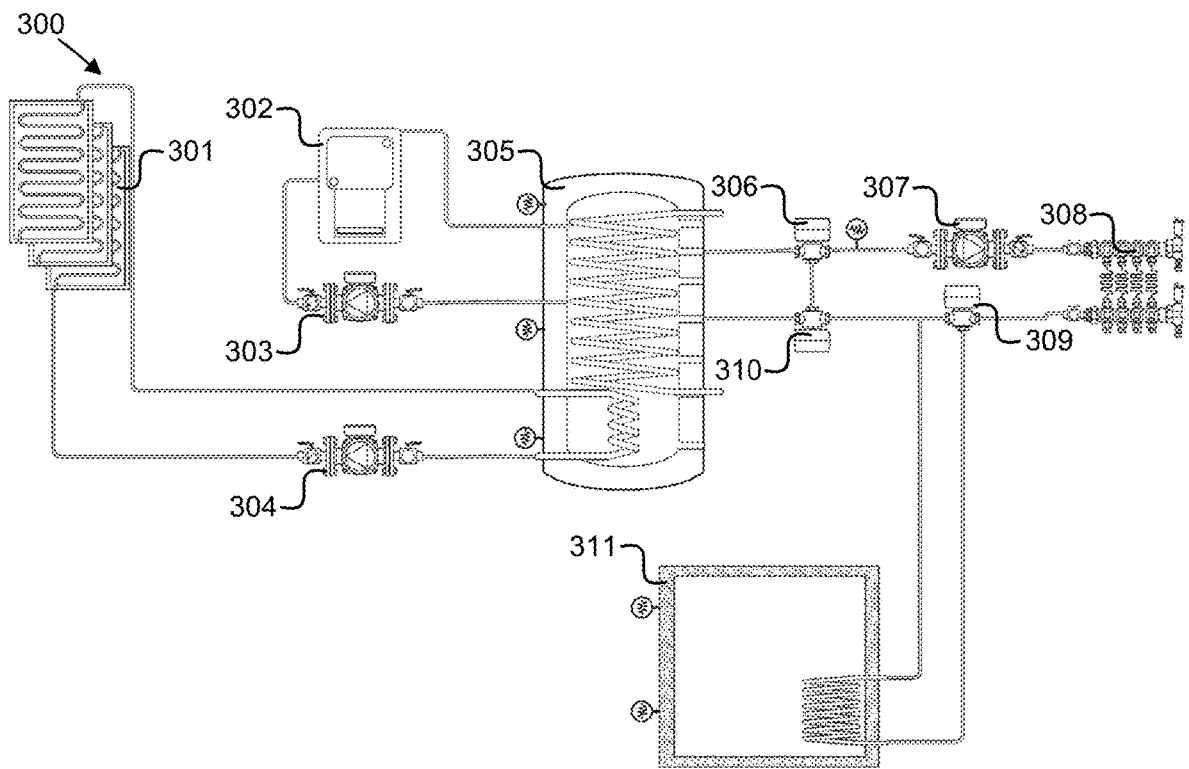
FIG. 3 An example system model.

FIG. 3 shows an example embodiment of a graphical representation of a system 300 of interconnected equipment. In this embodiment, the load/system head 308 connects via transport 307 into store 305. From the store 305, transport paths exist to a cooling source 311 or to load 308, via mixer 306. The illustrated system 300 also contains loops between store 305 through heating source 302 with an explicit transport 303, as well as between store 305 and solar thermal hot-water panel 301 with an explicit transport 304.

A sub-system is classified as synchronous when said sub-system routing paths are conjoined in an manner that only one sub-system may operate at a time; and a sub-system is classified as asynchronous when said sub-system routing paths are conjoined in a manner that two or more sub-systems may operate at the same time.

Figure 4:
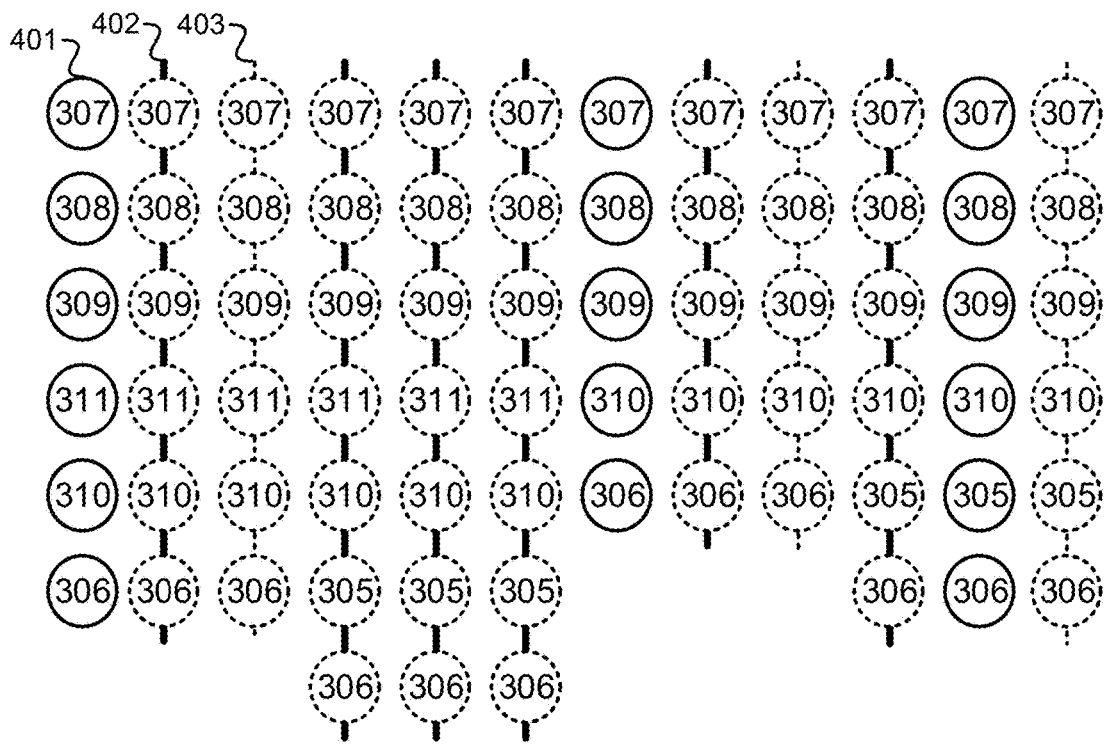
FIG. 4 Permutations of the example system model.

The decomposition process of a system may be accomplished by recognizing and extracting sub-systems from the system graph. Sub-system reduction to atomic sub-systems having a known equipment topology enable a machine learning engine to reason about the system and control the system in a uniform expected manner. (FIG. 4). A sub-system may be defined as starting at a source and ending at a sink. Resources are capable of supplying one or multiple sinks. Transports may split into multiple paths to other transports or multiple outputs and each path may be identified as a branch. Branches may be classified into one or multiple synchronous or asynchronous sub-systems. The process may also enforce specified design rules for sub-system and component recognition and extraction.

The decomposition process may also recognize characteristics of or relationships between sub-systems, such as deriving sub-system or branch type. The process may identify the sub-system as either synchronous or asynchronous based on the equipment and sub-system characteristics and capabilities. The process may also identify sub-systems with attributes like priority and precedence. For example, sub-systems may be organized in asynchronous and synchronous groups.

The process may also organize the whole deconstructed graph of systems, sub-systems, and equipment into structured maps, trees, or sets which can represent unions based on asynchronous and synchronous groups, or other characteristics.

Application of the methodology may yield sets of equipment that constitute the various sub-systems in the given system. FIG. 4 illustrates some of the equipment sub-systems that may be recognized, analyzed, and derived using the method described above from the example system in FIG. 3 (note that not all possible sub-systems are shown, for ease of illustration and readability). Individual pieces of equipment are represented as circles, containing the reference numeral of the corresponding piece of equipment. An individual sub-system is represented by a column 401, 402, 403 of equipment pieces. Sub-systems that are not faded or crossed out, such as column 401, are those sub-systems resulting from the decomposition process that are both unique and complete. Sub-systems that are faded and crossed out with a solid line, such as column 402, are those sub-systems that were identified in the decomposition process as being incomplete, for example, not having the required equipment as required in FIG. 3. Sub-systems that are faded and crossed out with a dashed line, such as column 403, are those sub-systems that were identified in the decomposition process as a duplicate system.

Figure 5:
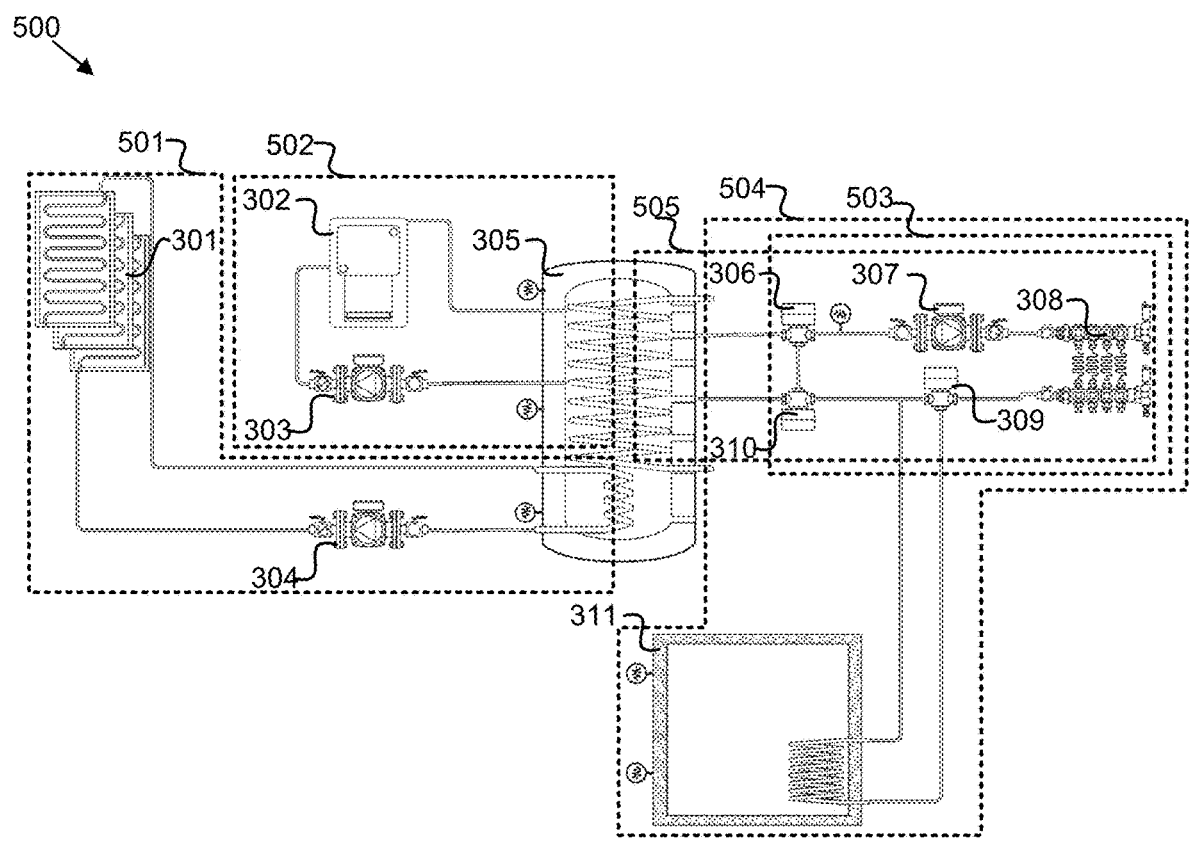
FIG. 5 Example system model with sub-system overlay.

Having executed the decomposition process, the sub-systems comprising a particular system may be classified. FIG. 5 shows the example system from FIG. 3 with all complete and unique sub-systems 501, 502, 503, 504, 505 overlaid on the system diagram.

Figure 6:
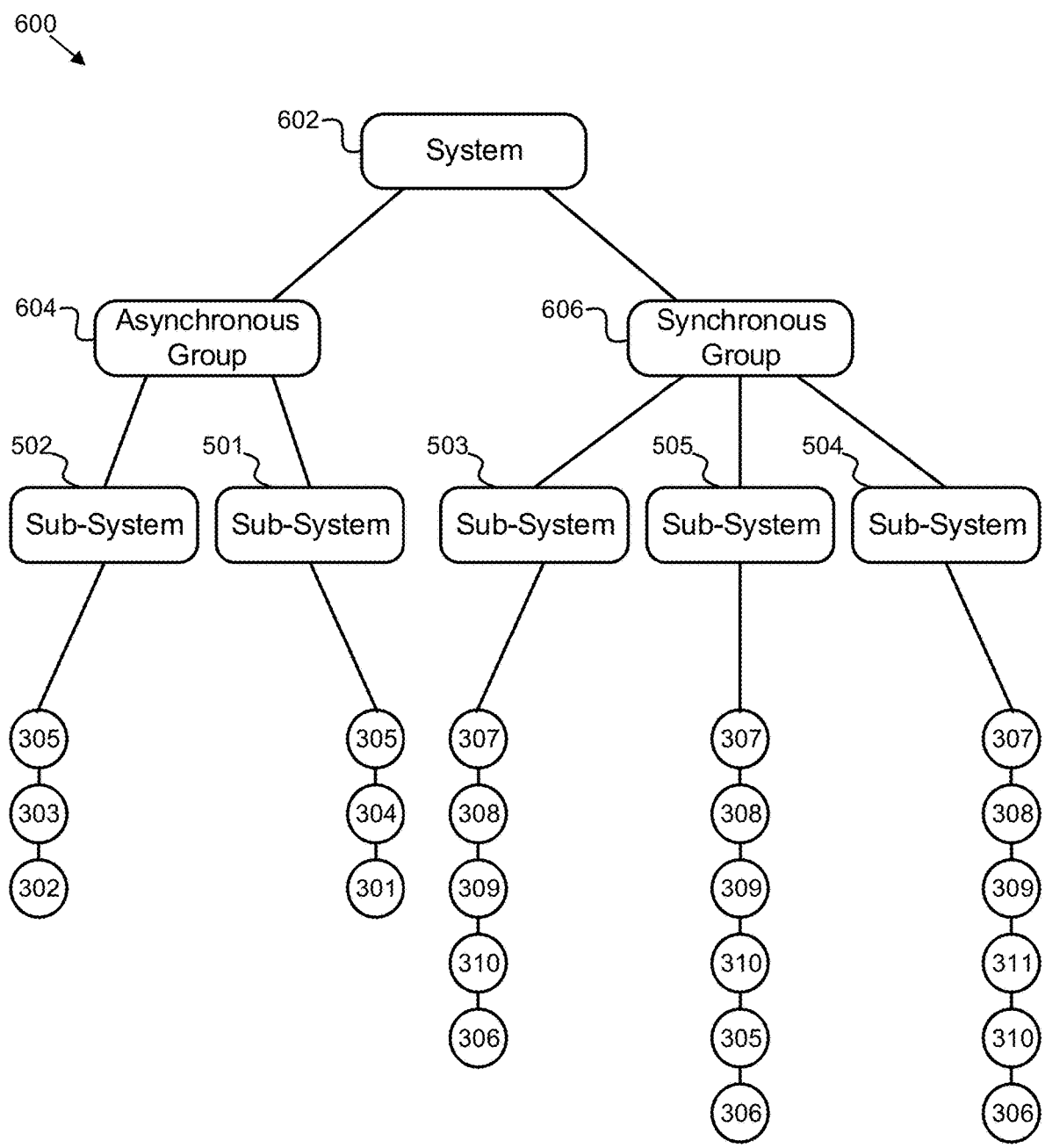
FIG. 6 Decomposition of example system model classification into groups.

As part of the decomposition process, sub-systems may be classified as either asynchronous or synchronous. FIG. 6 illustrates how the five unique, complete subsystems 501, 502, 503, 504, 505 derived from the whole system illustrated in FIG. 3 and FIG. 5 are classified. As shown, sub-systems 501 and 502 are asynchronous, and may be run simultaneously. Sub-systems 503, 504, and 505 are synchronous and must be run one at a time.

Figure 7:
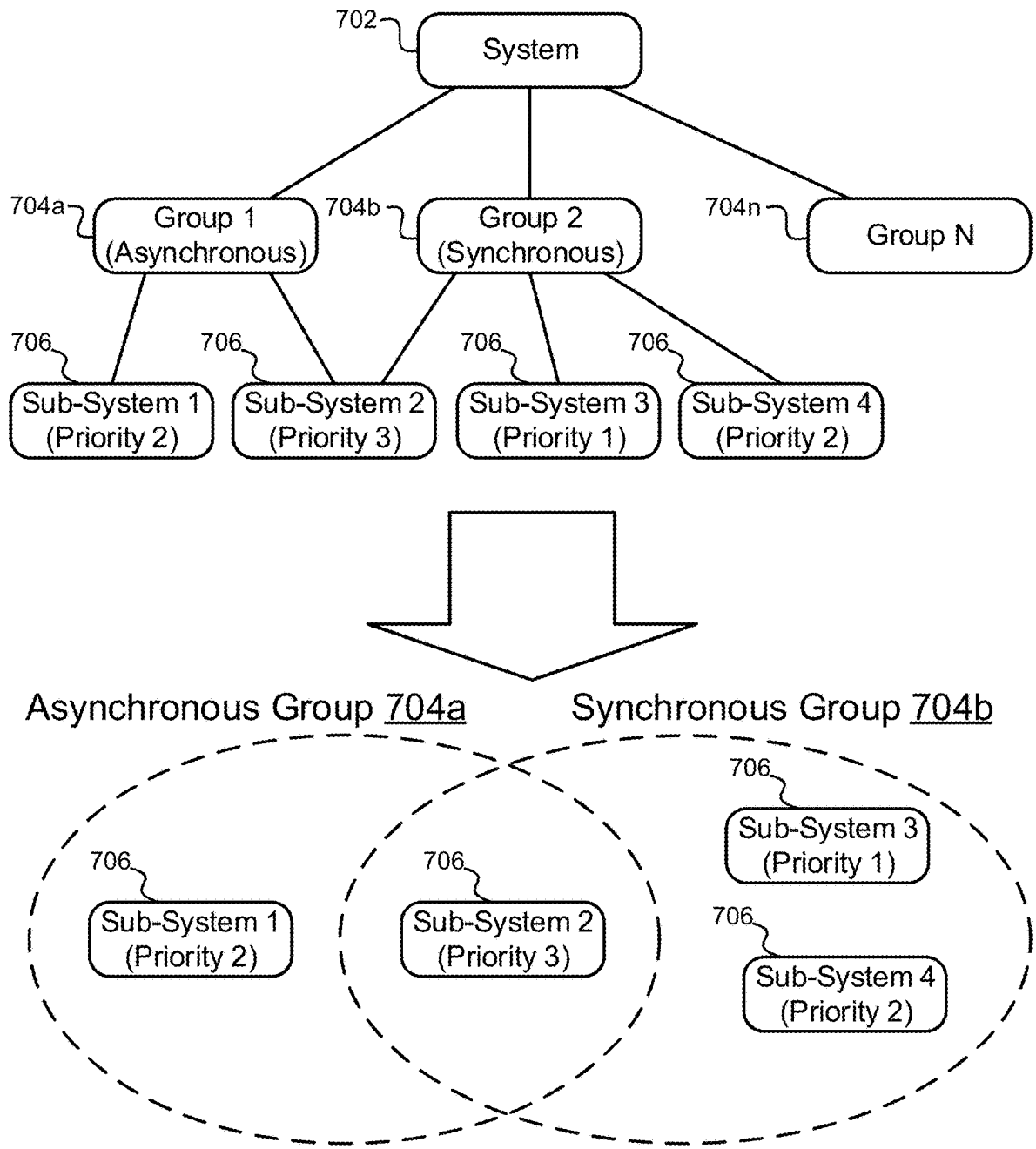
FIG. 7 Decomposition of an arbitrary system into groups with priorities.

A controlled system 702 may have any number of groups of sub-systems 706 representing any number and variety of characteristics. An illustration of one embodiment of how equipment sub-systems 706 may be grouped 704 and classified is shown in FIG. 7. A Sub-system 706 may belong to one or multiple groups 704a-n. For example, in the embodiment illustrated in FIG. 7 sub-system 2 belongs to both an asynchronous group 704a and a synchronous group 704b.

A controlled system 500 having multiple sub-systems 501, 502, 503, 504, 505 can further be deconstructed in such a way that the equipment or system states required to initialize the sub-system 501, 502, 503, 504, 505 are pre-computed. An embodiment is shown in FIG. 5, where the path routing devices 310, 306, 309 (in this case valves) are pre-computed for each of the 5 sub-systems 501, 502, 503, 504, 505 shown, reducing the managed state space. A controller thus knows the necessary starting state before performing a control action heuristic on the remaining and smaller state space.

Another embodiment of the present disclosure is for the purpose of semantic extraction. By decomposing systems into atomic sub-systems comprising the necessary components of source, sink, and transport, a control system may automatically control and manage these system components in a rule-based way. The controller may also apply meaning to a sub-system by means of classification or rule tables. These classifications and/or rules may be used to generate semantics for the system, the sub-systems, and the constituent parts. An embodiment can be seen in FIG. 5, wherein sub-system 501 may be labeled as a "solar sub-system" based on the resource of its source component. In another embodiment, the same sub-system 501 may be labeled as a "heat-to-storage" system classification, based on its producer consumer purpose. In another embodiment, it may be labeled as a "heating system", based on the classification of its sub-system 501. Many embodiments of semantic labeling are possible given a rule-based deconstruction of atomic sub-systems from a graph.

A graphical user interface 802 may be used to input or drive the creation of an equipment graph 804, such that an electronic device having a screen may be used to automatically deconstruct a controllable system from the graphical representation 802 of the controllable system, the equipment objects, sets, priority, and their relationships. An embodiment of such a device can be seen in FIG. 8. Other methods may be used, such as importing a HVAC, mechanical, architectural, and/or engineering drawings or files.

Figure 9:
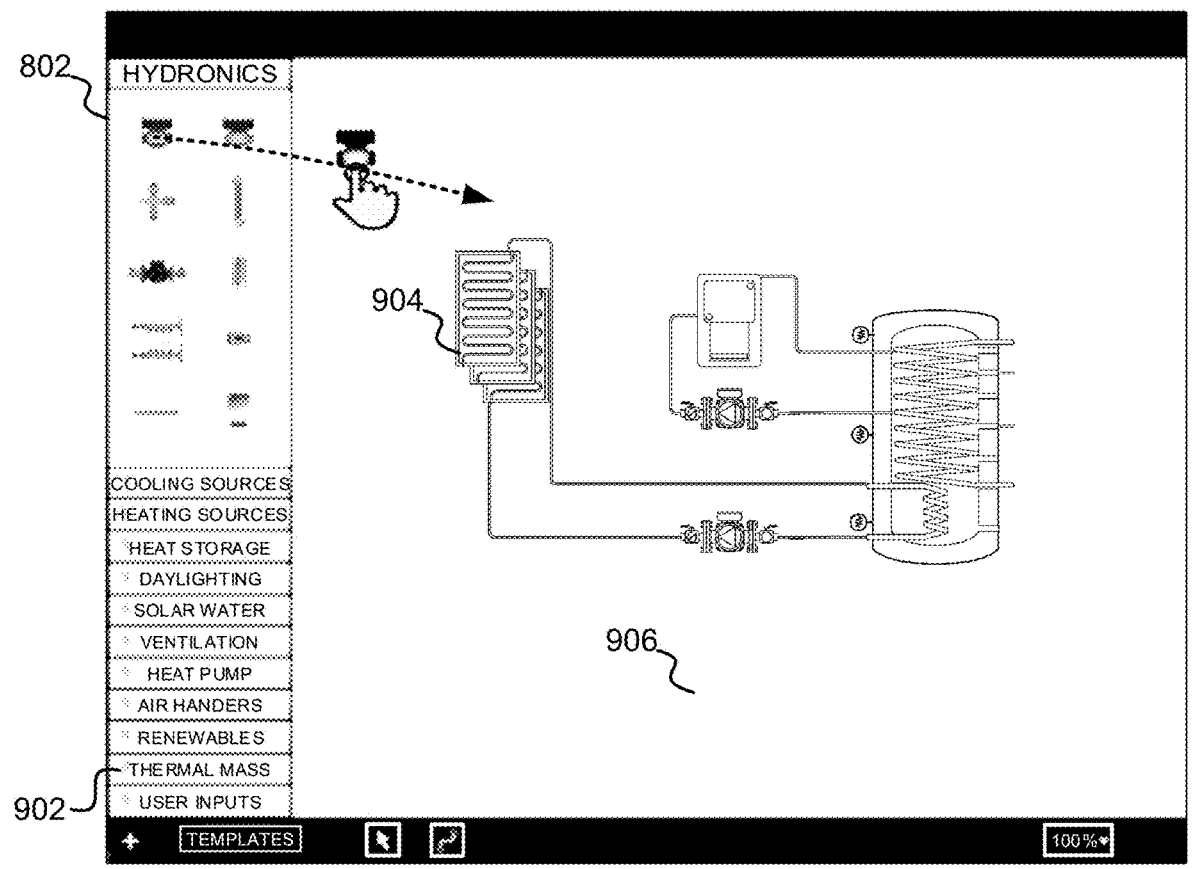
FIG. 9 An embodiment of a graphical user interface drawing device.

In some graphical user interface 802 embodiments having an electronic display, a user may drag and drop or instantiate equipment objects from an equipment object library 902 into a system drawing 904 on a drawing screen 906, either on a touchscreen, cursor driven input device, or other means. An embodiment can be seen in FIG. 9. Or the user can also create new equipment objects through drawing from fundamentals.

Figure 8:
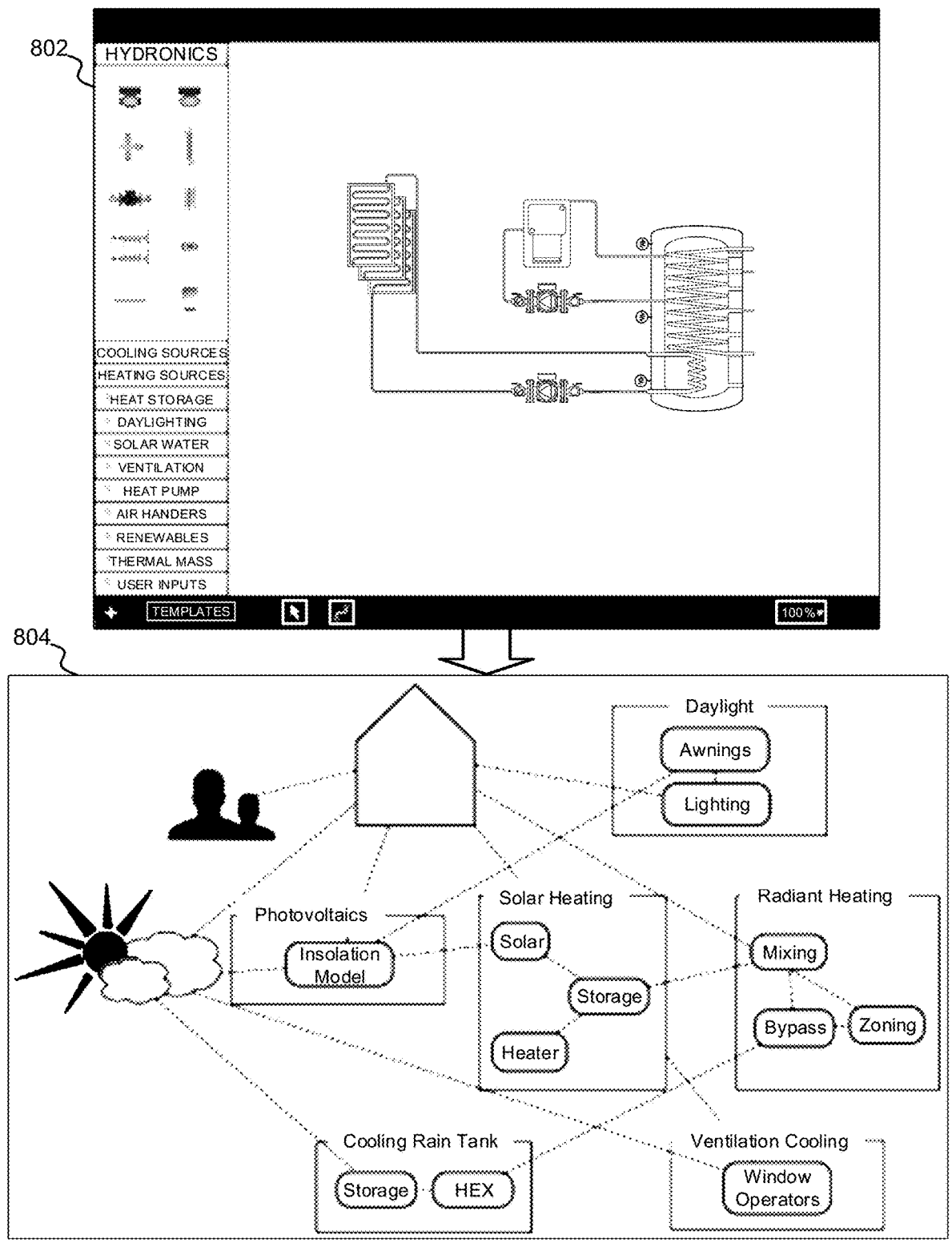
FIG. 8 Graphical user interface and deconstructed sub-system graph.

These drawings 904, made in situ or a-priori, can be disaggregated using the above methods into a graph 804 of sub-systems, priority, sub-system synchronicity, labeling, and the underlying control knowledge required to control the system in an unsupervised manner. An embodiment can be seen in FIG. 8, showing a hierarchal graph 804 of sub-systems.

Figure 10:
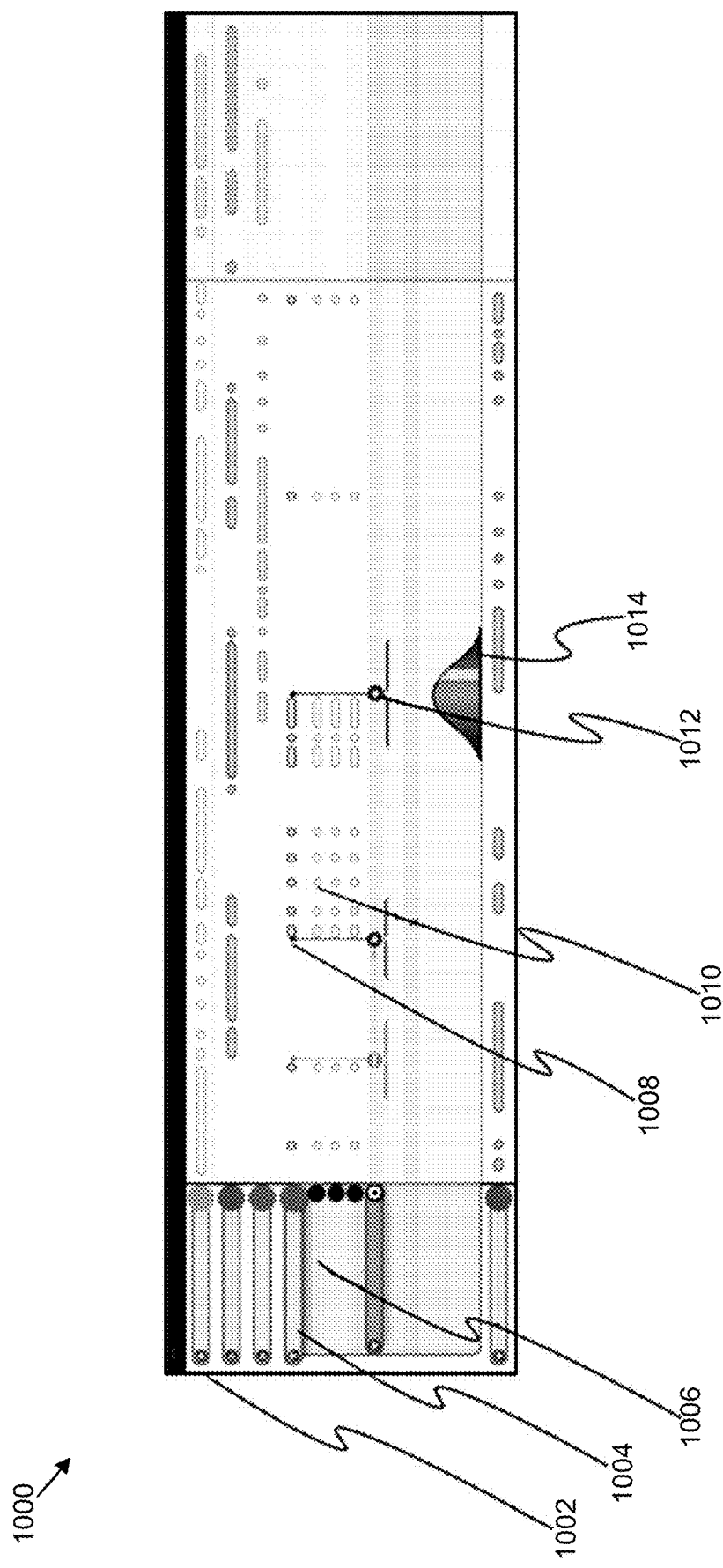
FIG. 10 An embodiment of semantic analytics.

These deconstructed graphs 804 of sub-system 1002 and their semantic labeling 1004 can be used to generate automatic analytics 1008, 1010, 1012, 1014 as in the embodiment in FIG. 10. In some embodiments the graphical display 1000 of equipment state and sensor values may be graphed in a time series labeled from the automated semantic extraction 1004 from the sub-systems 1002. Some embodiments of semantic labeling 1004 may take the form of a sub-system labeling 1004 by system purpose. In some embodiments, the system purpose may be extracted from its source equipment label, source-sink label, source-transport-sink label, the classified family of sub-system defined by those atomic attributes, and/or any other extracted attributes, labels, classifications, or other identifiers of its constituent equipment.

In some embodiments, the sub-system semantics 1004 may provide analytic display or graph grouping of equipment automatically, as in the embodiment in FIG. 10. In addition, as is shown in FIG. 10 such automatic labeling 1004 can correlate equipment actions 1012 and system actions 1008 with the corresponding sub-system 1004 without requiring manual programming.

The foregoing disclosure describes some possible embodiments of this invention, with no indication of preference to the particular embodiment. A skilled practitioner of the art will find alternative embodiments readily apparent from the previous drawings and discussion and will acknowledge that various modifications can be made without departure from the scope of the invention disclosed herein.

What is claimed is:
1. A method comprising:
   generating a system control scheme from a deconstruction of an equipment graph into controllable sets of prioritized sub-systems, wherein:
      the equipment graph comprises one or more sub-systems of equipment of the prioritized sub-systems; and
      the prioritized sub-systems comprise a unique routing path through the equipment graph; and
   pre-computing system states to initialize each of the prioritized sub-systems thereby reducing a managed state space for the prioritized sub-systems.

2. The method of claim 1, wherein the sub-systems are given a priority and sub-systems of at least one synchronous set are ranked for control precedence by the given priority.

3. The method of claim 1, wherein groups of sub-system sets form unions between the groups of sub-system sets whereby one or more pieces of equipment are shared between multiple of the groups of sub-system sets.

4. The method of claim 1, whereby the sub-systems of equipment are classified individually as one or more of a source, a sink, and a transport, wherein: the source comprises at least one resource source; the sink comprises at least one resource sink; the transport comprises at least one means of resource transport; and the transport is interposed between the source and the sink, such that the transport forms a sub-system that is actuated.

5. The method of claim 4, wherein the source comprises one or more of but is not limited to: utility generated electricity, site generated electricity, boiler, steam generator, gas turbine, gas heater, chiller, heat pump, adsorption heat pump, ground source heat pump, furnace, air conditioner, photovoltaics, solar hot water collector, wind turbine, hydro turbine, liquid or solid thermal storage tanks, mass thermal storage well, thermal electric generators, peltier junctions, carnot cycle engines, and water sources of irrigation.

6. The method of claim 5, wherein the sink comprises one or more of but is not limited to: buildings, building zones, building surfaces, building surface interlayers, electric batteries, electric loads, outdoor surfaces including snow melt surfaces, irrigation consuming masses, HVAC system equipment, functional control equipment, lights, motors, liquid thermal storage tanks, solid thermal storage tanks, mass thermal storage, and phase change materials.

7. The method of claim 6, wherein the transport comprises one or more of but is not limited to: pumps, fans, air handlers, dampers, valves, inverters, relays, actuators, linear divers, electromagnets, solenoids, switches, wires, and pipes.

8. The method of claim 7, wherein the resource comprises one or more of but is not limited to: environmental, liquid, thermal, electrical, and energy resources.

9. A building automation device comprising:
a memory; and
a processor operatively coupled to the memory and configured to execute program code stored in the memory to:
  receive a building system equipment graph;
  analyze the building system equipment graph to identify unique sub-systems of the building system equipment graph having a unique routing path;
  determine uniquely controllable sub-systems of the unique routing path of the building system equipment graph;
  classify the identified unique sub-systems together into sets, labeling the sets; and
  pre-compute system states to initialize each of the sets of the uniquely controllable sub-systems thereby reducing a managed state space for the sets of the uniquely controllable sub-systems.

10. The building automation device of claim 9, wherein the sets are classified as one or more of synchronous and asynchronous.

11. The building automation device of claim 9, wherein the sets are labeled with control precedence.

12. The building automation device of claim 9, wherein the sets form unions between the sets whereby one or more pieces of equipment are shared between multiple of the sets.

13. The building automation device of claim 9, wherein a deconstructed sub-system set graph of the labeled sets of identified unique sub-systems comprises static equipment state information to produce the unique routing path and the sets form unions between the sets whereby one or more pieces of equipment are shared between multiple of the sets.

14. A method comprising:
receiving a first user input to display one or more objects in a graphical user interface, the graphical user interface enabling a user to add graphic objects representing equipment to a graphical representation of a building automation system in response to receiving the first user input;

receiving a second user input in the graphical user interface, the graphical user interface enabling a user to interconnect the graphic objects into a system graph in response to receiving the second user input;

using a processor to process the system graph, identify one or more sub-systems of the system graph that have a unique routing path and deconstruct the system graph into sub-system sets comprising the identified one or more sub-systems of the system graph; and pre-computing system states to initialize each of the sub-system sets thereby reducing a managed state space for the sub-system sets.

15. The method of claim 14, wherein the equipment is classified individually as one or more of a source, a sink, and a transport, and the source comprises at least one resource source; the sink comprises at least one resource sink; the transport comprises at least one means of resource transport; and the transport is interposed between the source and the sink, such that the transport forms a sub-system that may be actuated.

16. The method of claim 14, wherein the sub-systems are semantically labeled from one or more of: a graphical user interface namespace; a sub-system source, sink, or transport; or a set of rules.

17. The method of claim 14, further comprising:
semantically labeling and grouping the one or more sub-systems from the sub-system sets;
providing, in the graphical user interface, one or more of automated analytics and graphs based on the semantically labeled and grouped one or more sub-systems from the sub-system sets.

18. The method of claim 17, wherein the sub-system sets are classified as one or more of synchronous and asynchronous.

19. The method of claim 17, wherein the sub-system sets are automatically ranked by one or more of control precedence and priority.

20. The method of claim 17, wherein the sub-system sets form unions between the sub-system sets whereby one or more pieces of equipment are shared between multiple of the sub-system sets.

* * * * *